United States Patent
Laskoski et al.

(10) Patent No.: US 9,085,692 B1
(45) Date of Patent: Jul. 21, 2015

(54) SYNTHESIS OF OLIGOMERIC DIVINYLDIALKYLSILANE CONTAINING COMPOSITIONS

(71) Applicants: Matthew Laskoski, Springfield, VA (US); Teddy M. Keller, Fairfax Station, VA (US); Andrew Saab, Washington, DC (US)

(72) Inventors: Matthew Laskoski, Springfield, VA (US); Teddy M. Keller, Fairfax Station, VA (US); Andrew Saab, Washington, DC (US)

(73) Assignee: The Government of The United States of America, as represented by The Secretary of the Navy, Washington, DC (US)

( * ) Notice: Subject to any disclaimer, the term of this patent is extended or adjusted under 35 U.S.C. 154(b) by 0 days.

(21) Appl. No.: 14/629,942

(22) Filed: Feb. 24, 2015

Related U.S. Application Data (60) Provisional application No. 61/944,223, filed on Feb. 25, 2014.

(51) Int. Cl.
C08L 71/00 (2006.01)

(52) U.S. Cl.
CPC ..................... C08L 71/00 (2013.01)

(58) Field of Classification Search
CPC ........................................ C08L 71/00
USPC ................... 524/700; 528/29, 397
See application file for complete search history.

(56) References Cited

U.S. PATENT DOCUMENTS

| | | | |
|---|---|---|---|
| 4,183,874 A | 1/1980 | Fan et al. |
| 4,200,728 A | 4/1980 | Blinne et al. |
| 4,209,458 A | 6/1980 | Keller et al. |
| 4,408,035 A | 10/1983 | Keller |
| 4,409,382 A | 10/1983 | Keller |
| 4,410,676 A | 10/1983 | Keller |
| 4,619,986 A | 10/1986 | Keller |
| H521 H | 9/1988 | Fan |
| 4,816,496 A | 3/1989 | Wada et al. |
| 5,003,039 A | 3/1991 | Keller |
| 5,003,078 A | 3/1991 | Keller |
| 5,004,801 A | 4/1991 | Keller et al. |
| 5,132,396 A | 7/1992 | Keller |
| 5,159,054 A | 10/1992 | Keller |
| 5,202,414 A | 4/1993 | Keller et al. |
| 5,208,318 A | 5/1993 | Keller |
| 5,237,045 A | 8/1993 | Burchill et al. |
| 5,247,060 A | 9/1993 | Keller |
| 5,262,514 A | 11/1993 | Keller |
| 5,272,237 A | 12/1993 | Keller et al. |
| 5,292,779 A | 3/1994 | Keller et al. |
| 5,292,854 A | 3/1994 | Keller |
| 5,304,625 A | 4/1994 | Keller |
| 5,350,828 A | 9/1994 | Keller et al. |
| 5,352,760 A | 10/1994 | Keller |
| 5,389,441 A | 2/1995 | Keller |
| 5,464,926 A | 11/1995 | Keller |
| 5,512,376 A | 4/1996 | Brady et al. |
| 5,824,744 A | 10/1998 | Gagne et al. |
| 5,895,726 A | 4/1999 | Imam et al. |
| 5,925,475 A | 7/1999 | Sastri et al. |
| 5,939,508 A | 8/1999 | Keller |
| 5,965,268 A | 10/1999 | Sastri et al. |
| 5,969,072 A | 10/1999 | Keller et al. |
| 5,980,853 A | 11/1999 | Keller et al. |
| 5,981,678 A | 11/1999 | Keller et al. |
| 6,001,926 A | 12/1999 | Sastri et al. |
| 6,225,247 B1 | 5/2001 | Keller et al. |
| 6,297,298 B1 | 10/2001 | Keller et al. |
| 6,362,289 B1 | 3/2002 | Keller et al. |
| 6,579,955 B2 | 6/2003 | Keller et al. |

(Continued)

FOREIGN PATENT DOCUMENTS

| WO | 0212252 | 2/2002 |
|---|---|---|
| WO | 2004008251 | 1/2004 |

OTHER PUBLICATIONS

Sastri et al., "Phthalonitrile Cure Reaction with Aromatic Diamines" Journal of Polymer Science: Part A: Polymer Chemistry, vol. 36, 1885-1890 (1998).

(Continued)

*Primary Examiner* — Kelechi Egwim (74) *Attorney, Agent, or Firm* — US Naval Research Laboratory; Joseph T. Grunkemeyer (57) ABSTRACT

A method of: providing a solution of: a dichloroaromatic compound having an electron-withdrawing group bound to each aromatic ring containing one of the chloride groups; an excess of a dihydroxyaromatic compound; a base; and a solvent; heating the solution to a temperature at which the dichloroaromatic compound and the dihydroxyaromatic compound react to form an aromatic ether oligomer; and reacting the aromatic ether oligomer with a chlorodialkylvinylsilane to form one or more vinyl-terminated compounds having the formula below. The aromatic ether oligomer is a dihydroxy-terminated compound or a dimetallic salt thereof. Water formed during the heating is concurrently distilled from the solution. Each R is an alkyl group, $Ar^1$ is a residue from the dichloroaromatic compound, $Ar^2$ is a residue from the dihydroxyaromatic compound, and n is a non-negative integer.

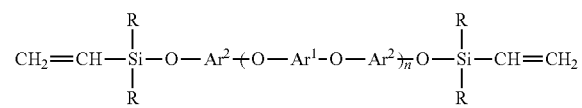

18 Claims, 4 Drawing Sheets

(56) References Cited

U.S. PATENT DOCUMENTS

| | | |
|---|---|---|
| 6,756,470 B2 | 6/2004 | Keller et al. |
| 6,784,259 B2 | 8/2004 | Keller et al. |
| 6,787,615 B2 | 9/2004 | Keller et al. |
| 6,891,014 B2 | 5/2005 | Keller et al. |
| 7,087,707 B2 | 8/2006 | Keller et al. |
| RE39,332 E | 10/2006 | Keller et al. |
| RE39,428 E | 12/2006 | Keller et al. |
| 7,342,085 B2 | 3/2008 | Keller et al. |
| 7,348,395 B2 | 3/2008 | Keller et al. |
| 7,452,959 B2 | 11/2008 | Keller et al. |
| 7,511,113 B2 | 3/2009 | Keller et al. |
| 7,723,420 B2 | 5/2010 | Laskoski et al. |
| 7,772,355 B2 | 8/2010 | Laskoski et al. |
| 7,863,401 B2 | 1/2011 | Laskoski et al. |
| 7,897,715 B1 | 3/2011 | Laskoski et al. |
| 8,039,576 B2 | 10/2011 | Laskoski et al. |
| 8,222,403 B2 | 7/2012 | Laskoski et al. |
| 8,288,454 B2 | 10/2012 | Keller et al. |
| 8,362,239 B2 | 1/2013 | Laskoski et al. |
| 8,735,532 B2 | 5/2014 | Keller et al. |
| 8,859,712 B2 | 10/2014 | Keller et al. |
| 2007/0161770 A1 | 7/2007 | Keller et al. |
| 2007/0161771 A1 | 7/2007 | Keller et al. |
| 2007/0265414 A1 | 11/2007 | Richter et al. |

OTHER PUBLICATIONS

Sastri et el., "Phthalonitrile-Carbon Fiber Composites" Polymer Composites, Dec. 1996, vol. 17, No. 6.

SYNTHESIS OF OLIGOMERIC DIVINYLDIALKYLSILANE CONTAINING COMPOSITIONS

This application claims the benefit of U.S. Provisional Application No. 61/944,223, filed on Feb. 25, 2014. The provisional application and all other publications and patent documents referred to throughout this nonprovisional application are incorporated herein by reference.

TECHNICAL FIELD

The present disclosure is generally related to the synthesis of oligomeric divinyldimethylsilane containing compositions.

DESCRIPTION OF RELATED ART

The rapid advancement of modern technology in recent years has increasingly demanded new high performance materials for use in a wide variety of engineering applications and under unusual service conditions. Clear high temperature elastomers, coatings, fibers, and plastics that have thermal, thermo-oxidative and hydrolytic stability above 300° C. (572° F.) are in demand for numerous marine, aerospace, and domestic applications but are not readily available. High temperature, tough elastomers are needed for high voltage electrical cables for advanced ships. Such elastomers are highly desirable for components in high flying airplanes and space vehicles, which experience extreme variations of temperatures from as low as −50° C. to as high as 300-350° C. Crosslinked elastomers or networked systems would also be highly desirable for high temperature integral fuel tank sealants, which require long lasting elastomers (up to 10,000 hours) for use from −60° C. to 400° C. without swelling on contact with jet fuels but with excellent adhesion and inertness toward metallic substrates. Flame resistant, elastomeric, and plastic fibers are in increasing demand in the manufacture of military and domestic uniforms fabricated from the corresponding textiles.

BRIEF SUMMARY

Disclosed herein is a method comprising: providing a solution comprising: a dichloroaromatic compound comprising an electron-withdrawing group bound to each aromatic ring containing one of the chloride groups; an excess of a dihydroxyaromatic compound; a base; and a solvent; heating the solution to a temperature at which the dichloroaromatic compound and the dihydroxyaromatic compound react to form an aromatic ether oligomer; and reacting the aromatic ether oligomer with a chlorodialkylvinylsilane to form one or more vinyl-terminated compounds having the formula below. The aromatic ether oligomer is a dihydroxy-terminated compound or a dimetallic salt thereof. Water formed during the heating is concurrently distilled from the solution. Each R is an independently selected alkyl group, $Ar^1$ is a residue from the dichloroaromatic compound, $Ar^2$ is a residue from the dihydroxyaromatic compound, and n is a non-negative integer.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is the development of high temperature, flame resistant elastomers, fibers, and composites and composite processability issues based on cost effective manufacturing techniques such as resin transfer molding (RTM), resin infusion molding (RIM), filament winding, and spinning or protrusion of fibers. To achieve these goals, units are incorporated within the polymer backbone to enhance the flammability resistance and thermo-oxidative properties while retaining low temperature processability and to use cost effective reactants in the synthesis to produce affordable resins for scale up and transition efforts.

Also disclosed herein is a method for the synthesis of oligomeric divinyldimethylsilane-terminated aromatic ether-aromatic ketone-containing resins and oligomeric PEEK-like divinyldimethylsilane resin—bisphenol divinyldimethylsilane compositions, which are precursors to flame resistant, high temperature elastomers/coatings, fibers, and plastics. Clear, high temperature, flame resistant polymers that can be processed under ambient conditions containing oligomeric aromatic ether-aromatic ketone units between the polymerization centers are previously unreported. The vinyl terminated units are interconnected by aromatic ether-aromatic ketone moieties with varying lengths to affect the physical properties. Since the divinyldimethylsilane-terminated oligomers are viscous liquids and are soluble in most organic solvents, they can be easily fabricated into shaped elastomeric and plastic components or can be deposited onto fibrous materials as coatings in the presence of a curing additive. In addition, the resin mixture can be spun into fibers and fully cured to flame resistant fibers useful for textiles. The polymerization reaction can be controlled as a function of the temperature with polymerization occurring fairly rapidly under ambient condition but at a much slower rate at lower temperatures. The curing additive typically contains multiple —SiH units that react with the vinyl unit of the vinyldimethylsilane group, which is a hydrosilylation reaction.

The synthetic method involves the reaction of a dihydroxyaromatic compound, such as a bisphenol, with a dichloroaromatic compound, such as 4,4'-dichlorobenzophenone, in the presence of a base and a high boiling solvent such as DMF, DMSO, or DMAC at temperatures in excess of 150° C. to initially form the oligomeric aromatic ether-aromatic ketone terminated as a phenolate salt. The reaction can be performed in the presence of an excess of the bisphenol, which means at this stage that the phenolate salt is a mixture of the oligomeric aromatic ether-aromatic ketone diphenolate salt and the diphenolate of the excess bisphenol; the bisphenol diphenolate can be easily varied in the composition. The method involves the reaction of a bisphenol with 4,4'-dichlorobenzophenone in the presence of a base and an optional soluble organic copper complex or a copper, platinum, or palladium salt, which speeds up the reaction and moderates the reaction conditions. In the absence of the metallic salt catalyst, the reaction may be slower and may be performed at higher temperatures to complete the reaction. The reaction may readily occur in high yield for the lower molecular oligomeric vinyldimethylsilanes. The phenolate salt may be converted to the dihydroxyl terminated compound by combining with dilute acidic solution. Further reaction of the dihydroxyl terminated aromatic ether-aromatic ketone oligomers or the mixture of the dihydroxyl terminated aromatic ether-aromatic ketone oligomers and excess bisphenol with chlorovinyldimethylsilane in the presence of a base such as triethylamine and solvent results in the formation of the corresponding divinyldimethylsilane terminated systems. Previously, the oligomeric vinyldimethylsilanes were synthesized with the more reactive and more costly 4,4'-difluorobenzophenone, which readily occurred at 150° C. in dipolar aprotic solvents. The initial reaction to the phenolate must be performed at (1) a slightly higher temperature due to the lower reactivity of the 4,4'-dichlorobenzophenone relative to 4,4'-difluorobenzophenone or (2) at lower temperatures in the presence of the soluble organic copper complex or a copper, platinum, or palladium salt. The initial reaction may occur readily. In addition, 4,4'-dichlorobenzophenone is considerably less expensive relative to 4,4'-difluorobenzophenone, which allows the divinyldimethylsilane systems to be much more cost effective.

The oligomeric aromatic ether-aromatic ketone-containing divinyldimethylsilane terminated resins and oligomeric divinyldimethylsilane resin-bisphenol divinyldimethylsilane mixture are polymerized through the terminated vinyldimethylsilane groups to afford high temperature, flame resistant elastomers or thermosets. The rate of polymerization can be controlled by the temperature and the amount or concentration of metallic curing catalyst. Depending on the curing additive, elastomers or plastics can be obtained from the oligomers or resin mixture. Polymeric coatings, fibers, and composites formulated from the new oligomeric aromatic ether-aromatic ketone-containing divinylsilane terminated resins or the combination mixture system have outstanding thermo-oxidative and flammability properties for military (ship, submarine, aerospace) and domestic applications and can withstand continuous high temperatures (300-375° C.) in oxidative environments such as air for extended periods. The use of low molecular weight precursor resins to obtain thermosetting polymeric materials with high thermo-oxidative properties is often advantageous from a processing standpoint. Precursor resins are useful in composite fabrication by a variety of methods such as infusion, resin transfer molding, and prepreg consolidation. With the disclosed oligomeric monomers, processability to clear coatings and shaped composite components can be achieved in non-autoclave conditions by cost effective methods.

Figure 1:
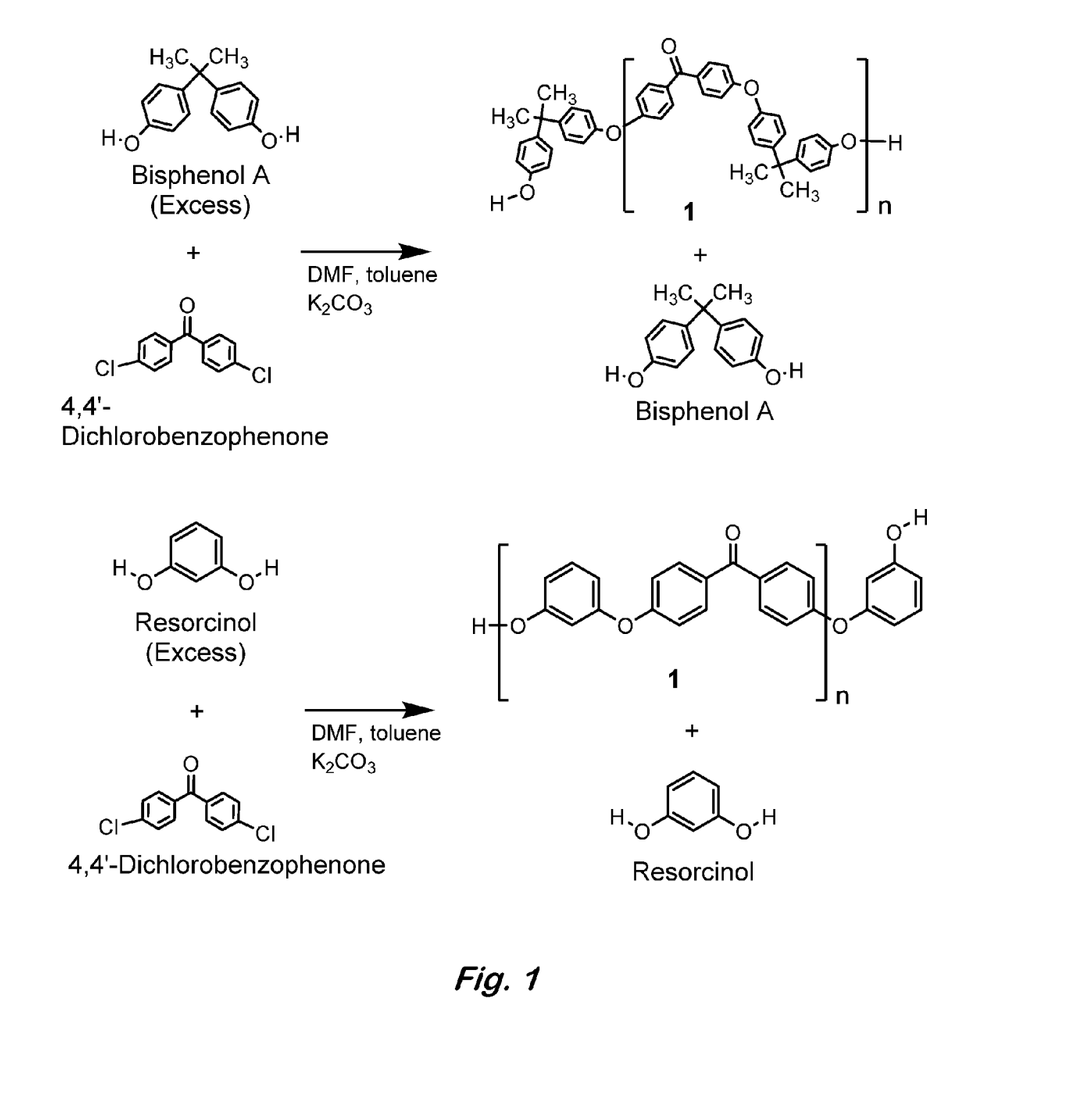
FIG. 1 shows the synthesis of dihydroxyl terminated oligomer 1-bisphenol product composition.

It may be desirable to design and prepare clear liquid oligomeric divinyldimethylsilane terminated resins, which upon polymerization under low temperature or ambient conditions will retain useful thermo-oxidative properties (300-375° C.) similar to phthalonitrile polymers and which can be converted to either elastomers, fibers, or plastics. The "oligomeric" term means that more than one compound is formed during the synthesis of oligomeric 1 (FIG. 1), with the average molecular weight dependent on the ratios of reactants, bisphenol and 4,4'-dichlorobenzophenone, used. Excess bisphenol can be used so as to have varying amount of unreacted bisphenol presence in the reaction composition that ultimately reacts with the chlorodimethylvinylsilane. Resin compositions containing the oligomeric vinylsilane resin and the bisphenol vinylsilane are advantageous for a number of plastic applications requiring elevated glass transition temperatures.

Figure 2:
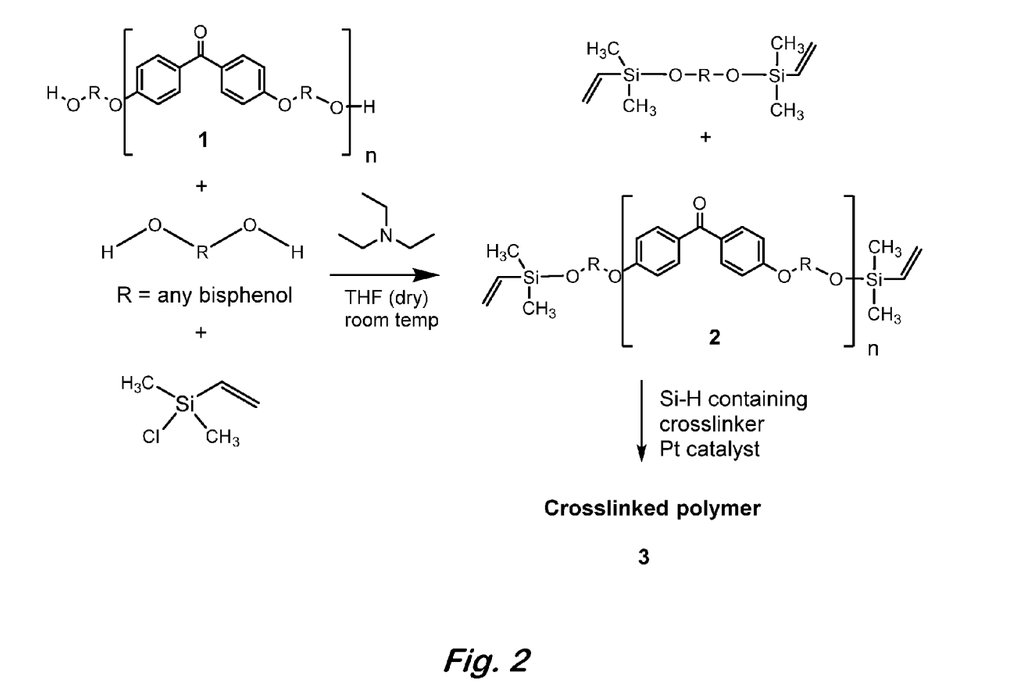
FIG. 2 shows the general synthesis of vinyl terminated oligomer 2 and polymerization to networked polymer 3.
Figure 3:
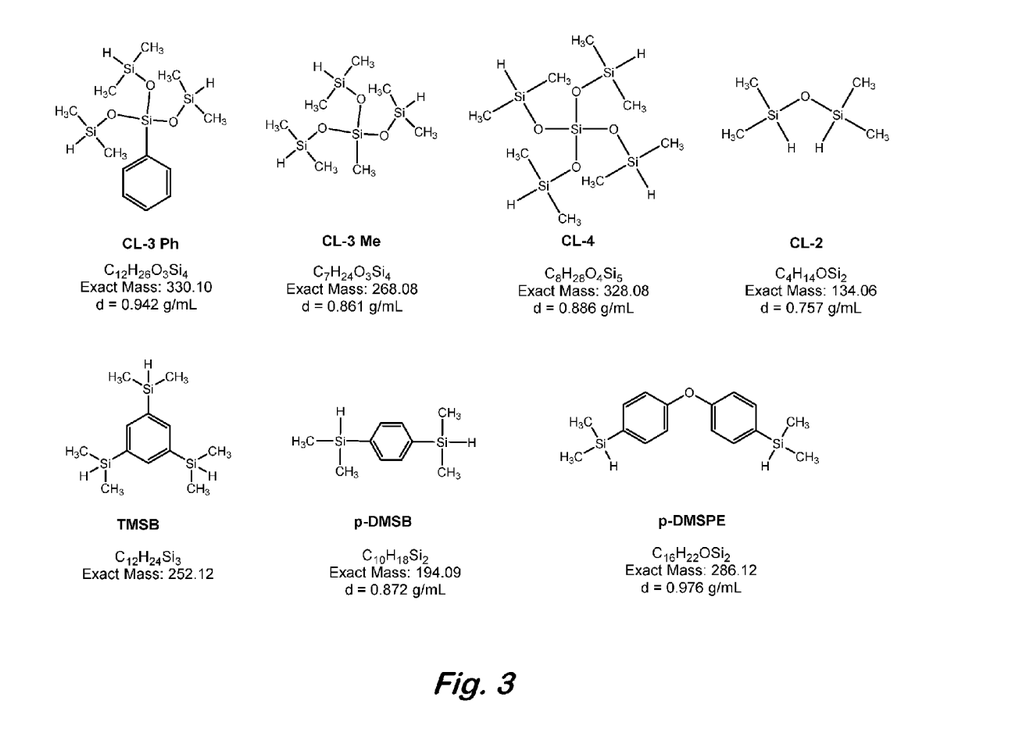
FIG. 3 shows crosslinkers used in the polymerization of 2.
Figure 4:
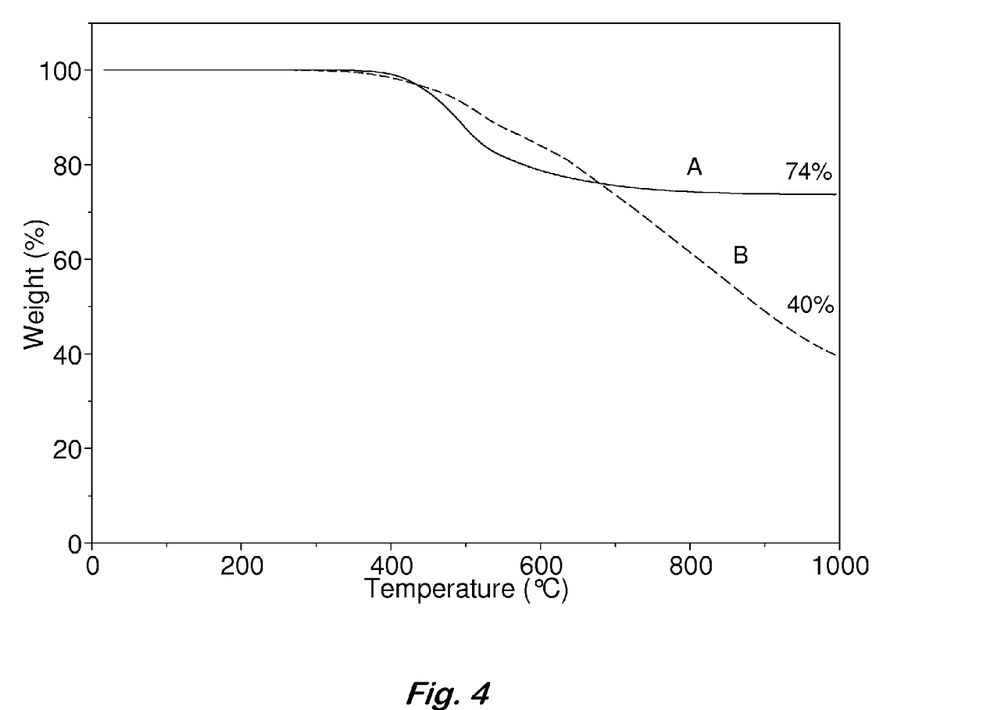
FIG. 4 shows TGA thermograms of a bisphenol A/benzophenone vinyldimethylsilane cured with CL-4 and post-cured to 300° C. for 1 h. The resulting polymers were heated under (A) nitrogen (top) and (B) air (bottom).

The synthesis of a series of multiple aromatic ether-aromatic ketone dihydroxyl terminated oligomers 1 (FIG. 1), which contain aromatic ether and aromatic ketone units in the backbone, has been achieved by a nucleophilic reaction between stoichiometric amounts of a bisphenol (excess) and 4,4'-dichlorobenzophenone in the presence of $K_2CO_3$, dipolar aprotic solvent (DMF, DMSO, or DMAC) and toluene or under the same reaction conditions but including a soluble organic copper complex or a copper, platinum, or palladium salt to speed up the reaction and to perform the reaction at lower temperatures. The mixed solvent system (dipolar aprotic solvent and toluene) allows the azeotropic distillation of the water formed as a by-product in the reaction at temperatures between 135 and 145° C. Further reaction of 1 with chlorodimethylvinylsilane afforded the divinyldimethylsilane terminated oligomers 2 in 91-95% yields (FIG. 2). Oligomers 2 are readily soluble in common organic solvents such as toluene, DMF, acetone, methylene chloride, ether, and chloroform. The structure of the oligomers 2 were confirmed by FTIR and $^1$H-NMR spectroscopy. The length of the spacer between the terminal divinyldimethylsilane groups of 2 can be varied by changing the ratio between bisphenol (excess) and 4,4'-dichlorobenzophenone. Oligomeric divinyldimethyl silane resins 2 may be clear liquids, which enhance their importance for coating and other high temperature applications. Changing any of the variables mentioned above can lead to thermoset polymers 3 (FIG. 2) of different properties. For the oligomeric vinyldimethylsilane-biphenol vinyldimethylsilane mixture, the 4,4'-dichlorobenzophenone and bisphenol (excess) are present such that all of the chloro groups on 4,4'-dichlorobenzophenone are reacted with varying amounts of bisphenol remaining unreacted resulting in the formation of the dihydroxyl terminated oligomer-biphenol product (FIG. 1), which then reacts with chlorodimethylvinylsilane to form the mixture (FIG. 2). Reaction of 2 or 2-bisphenol divinyldimethylsilane composition with any compound (curing additive) containing multiple —SiH units leads to clear thermosetting polymer 3 (elastomers, fibers, and plastics). Thus, it is possible to tailor the cured polymer 3 according to specific needs. Several different curing additives may be used singly or in combination (FIG. 3). The crosslinked polymer 3 may exhibit outstanding thermal and oxidative properties. FIG. 4 shows the thermograms of bisphenol A/benzophenone divinyl silane 2 cured with CL-4 up to 100° C. and postcured to 300° C. for 1 h. The polymer is stable to temperatures in excess of 300° C. When heated to 1000° C. under a flow of nitrogen and air, the polymer shows weight retention of 74% and 40%, respectively (FIG. 4). Surprisingly, the polymer displayed a weight retention in air superior to that of other highly aromatic systems.

Low molecular weight aromatic ether-aromatic ketone-containing oligomer 1 or oligomer 1-bisphenol mixtures were synthesized from the reaction of 4,4'-dichlorobenzophenone and an excess of a bisphenol in the presence of a base and solvent or in the presence of a base, solvent, and catalyst; the catalyst enhanced the reaction conditions. The oligomer 1 and excess bisphenol (more than stoichiometric amount of bisphenol used) were used in the preparation of oligomeric divinyldimethylsilane terminated resin 2 or the oligomer divinyldimethylsilane resin 2-bisphenol vinyldimethylsilane mixture with improved physical properties. The oligomer 2 or oligomer 2-bisphenol divinyldimethylsilane mixture was easily converted to crosslinked polymer 3 or crosslinked mixture polymeric composition under thermal conditions and in the presence of a curing additive/catalyst. Upon addition of the curing additive/catalyst at or below room temperature, the vinyldimethylsilane groups commence to react. A thermoset formed from reaction of the vinyl units would be highly crosslinked. Thus, depending on the curing conditions, curing additive/catalyst, and thermal parameters, high temperature thermosetting soft-to-hard rubber-to-plastic-to-carbon/ceramic composition can be readily obtained. The thermosets (elastomers, fibers, and plastics) crosslinked polymer 3 or crosslinked mixture polymeric composition show outstanding and superior thermo-oxidative properties. FIG. 4 shows TGA thermograms of the bisphenol A derived phthalonitrile thermoset 3 that has been heated to 1000° C. The polymer 3 exhibits thermal and oxidative stability to about 400° C. before any significant weight loss occurred. In essence, the overall physical properties of the crosslinked polymer can be tailored by varying the bisphenol reactant in the synthesis of 2. Regardless of whether the cured polymer is an elastomer, fiber, or plastic, transparent shaped compositions are formed, thereby enhancing their importance for electronic, electrical, and structural applications. Due to the superb thermal and oxidative stability of thermoset or network polymers 3 cured to temperatures in excess of 350° C., the materials have potential for a variety of applications including the fabrication of advanced composite components (ship, aerospace, and marine) by conventional prepreg consolidation, RTM, injection molding, and filament winding and as a coating for electronic devices and for electrical insulators for high voltage cables. Moreover, flame resistant, high temperature fibers useful for textiles are not readily available and can be obtained from the divinyldimethylsilane resins of this invention. Thus, due to the high char yield (FIG. 4), the vinyl-based polymers would be expected to exhibit improvements in specific physical properties when used at high temperatures or in a fire environment.

The synthesis of the oligomer 1 or oligomer 1-bisphenol mixtures may be performed as a simple one-pot, one step reactions and may proceed in high yield. Reaction of 1 or oligomer 1-bisphenol mixtures with chlorodimethylvinylsilane affords 2 or oligomer 2-bisphenol divinyldimethylsilane mixtures quantitatively. By controlling the ratio of reactants, bisphenol and 4,4'-dichlorobenzophenone, in the synthesis of compound 1 or oligomer 1-bisphenol mixtures, different percentages of vinyl and aromatic ether-aromatic ketone units can be obtained in the resulting oligomeric compound 2 or oligomer 2-bisphenol divinyldimethylsilane mixtures. An ideal combination of reactants can be found to produce a crosslinked polymer 3 or crosslinked mixture polymeric composition tailored for a particular application.

The crosslinked polymer 3 or crosslinked mixture polymeric composition are the polymers from precursor resins containing aromatic ether-aromatic ketone-silane units in the backbone. The synthetic scheme affords a method for varying the concentration of aromatic ether-aromatic ketone and vinyl units. Through crosslinking of the vinyl units, the resulting thermoset can exhibit properties from soft-to-hard rubber-to-plastics. As observed previously from other linear oligomeric monomers developed as precursors to high temperature crosslinked polymers, the network elastomeric, fibrous, and plastic systems will be expected to show outstanding thermo-oxidative stability and other desirable physical properties.

In the first synthesis step, a solution that includes the dichloroaromatic compound, the dihydroxyaromatic compound, the optional organic transition metal complex or transition metal salt, the base, and the solvent is provided. The dichloroaromatic compound is present in an excess amount, such as a molar ratio of dihydroxyaromatic to dichloroaromatic of 2:1 to 3:1. For the reaction to readily occur, the dichloroaromatic compound is activated by one or more electron withdrawing groups. The electron withdrawing group(s) are bound to each of the aromatic rings that have one of the chloride groups. If the two reacting chloride groups are on the same ring, they are not considered to be electronic withdrawing groups that activate each other, though a third chloride could perform this function. The compound may have a single electron withdrawing group that activates both chlorides, either in a single ring or bridging two rings. Benzophenone has an electron withdrawing carbonyl unit to activate the chloro units being displaced by the nucleophilic reaction of the dipotassium or disodium salt of the dihydroxy-terminated aromatic reactant. Other activators may also work to enhance the displacement of the chloro unit, such as sulfonyl ($—S(=O)_2—$), sulfinyl ($—S(=O)—$), phosphoryl ($—P(=O)—$), and multiple carbonyl or other units with the dichloroaromatic compound, to nucleophilic displacement. Other groups known in the art to be electron withdrawing groups may also be used. Dichlorobenzophenenones, including 4,4'-dichlorobenzophenenone, are suitable. Another suitable compound is bis(4-chlorophenyl)sulfone. Any dihydroxyaromatic compound may be used, including but not limited to, a bisphenol, 2,2-bis(4-hydroxyphenyl)propane, 1,1,1,3,3,3-hexafluoro-2,2-bis(4-hydroxyphenyl)propane, 4,4'-dihydroxybiphenyl, or resorcinol may be used. Other suitable reactants are disclosed in U.S. Pat. Nos. 8,859,712; 8,362,239; 8,222,403; 8,039,576; 7,511,113; 7,452,959; 6,891,014; 6,756,470; 6,297,298; 6,001,926; 5,965,268; 5,939,508; 5,925,475; 5,895,726; 5,464,926; 5,389,441; 5,352,760; 5,350,828; 5,304,625; 5,292,854; 5,262,514; 5,247,060; 5,237,045; 5,208,318; 5,202,414; 5,159,054; 5,132,396; 5,004,801; 5,003,078; 5,003,039; 4,619,986; 4,410,676; 4,409,382; 4,408,035; and 4,209,458. The dichloro- and dihydroxy-compounds also include trifunctional and higher such compounds. The reaction proceeds essentially the same way regardless of the dichloroaromatic and dihydroxyaromatic selected.

The optional organic transition metal complex may be in solution with the reactants, but this is not required. Transition metal salts may be only partially soluble at a given temperature, but may still be used in the reaction. Multiple such catalysts may be used to enhance the reaction conditions. Suitable transition metals include Cu, Zn, Fe, Co, Ni, Pd, and Pt. One suitable copper complex is bromotris(triphenylphosphine)copper(I) (($PPh_3$)$_3$CuBr). Other suitable compounds may be found in the above cited patents as well as in U.S. Pat. Nos. 8,288,454; 7,897,715; 7,723,420; 7,511,113; 7,348,395; 7,342,085; 7,087,707; and 5,980,853. Suitable bases include, but are not limited to, potassium carbonate, sodium hydroxide, potassium hydroxide, and a combination thereof. Other suitable bases may be found in the above cited patents.

Any solvent that dissolves the aromatic compounds and can be heated to a temperature that causes the reaction may be used. Higher boiling point solvents may be suitable as the chloro compounds are less reactive than the similar fluoro compounds. Suitable solvents include, but are not limited to, dimethylsulfoxide (DMSO), a mixture of toluene and DMSO, N,N-dimethylacetamide (DMAC), N-methylpyrrolidinone (NMP), and others disclosed in the above cited patents. DMSO may allow for higher reaction temperatures such as 170°, resulting faster reaction times. Lower boiling solvents such as DMAC and DMF may be suitable at lower temperatures when a copper catalyst is used.

The solution may be heated to, for example 130-150° C., greater than 150° C., 165° C., 170° C., 180° C., or higher, causing formation of the oligomer. The oligomer may be formed as a salt of the metal from the base, such as a potassium salt. Formation of the hydroxyl form may also occur by reaction with water. The water formed from the reaction of the aromatic compounds is distilled as the reaction progresses in order to move the reaction to completion. The use of high temperatures, along with the copper compound, can increases the reaction yield, which may be, for example, at least 90% or at least 95%. The yield may be higher than typically seen using the fluoro analogs of the chloro compounds. Bisphenols may generally have a higher yield than resorcinol.

The oligomer may then be reacted with a vinyl dialkylsilane, for example chlorodialkylvinylsilane, to add terminal vinyl silyl groups to the oligomer. The reaction may be performed in the presence of triethylamine and THF. The reaction yields may be 91-95%. The vinyl-terminated oligomers may be readily soluble in common organic solvents such as toluene, DMF, acetone, methylene chloride, ether, and chloroform. The structure may be confirmed by IR and $^1$H-NMR spectroscopy. The length of the spacer between the terminal divinyl groups can be varied by changing the ratio between the diol and the benzophenone, and mixtures of multiple lengths may be used. For example, the vinyl-terminated compounds may comprise the n=o compound or both the n=0 and n=1 compounds. The oligomeric divinyl resins may be clear liquids, which may enhance their importance for coating applications.

The reaction of the vinyl-terminated oligomers with any compound (curing additive) containing multiple SiH units may lead to a clear thermosetting polymer (elastomers and plastics). Thus, it is possible to tailor the cured polymer according to specific needs. Suitable curing additives include, but are not limited to, tetrakis(dimethylsiloxy)silane (CL-4); methyl tris(dimethylsiloxy)silane (CL-3 Me); phenyl tris(dimethylsiloxy)silane (CL-3 Ph); bis[(p-dimethylsilyl)phenyl]ether; diphenylsilane; 1,1,3,3-tetramethyldisiloxane (CL-2); 1,1,3,3,5,5,7,7-octamethyltetrasiloxane; tris(dimethylsilyl)benzene; p-bis(dimethylsilyl)benzene; bis[(p-dimethylsilyl)phenyl]ether; and hydride-terminated polydimethylsiloxane. The thermoset may be made from more than one oligomer, including oligomers differing in the value of n, including n=0. The crosslinked polymer may exhibit outstanding thermal and oxidative properties.

Upon addition of the curing additive at room temperature, the ketone and vinyl groups may commence to react as shown below. The ketone group may be more reactive. A thermoset formed from reaction of both the ketone and the vinyl units with the silane groups would be highly crosslinked. Thus, depending on the curing conditions and thermal parameters, high temperature thermosetting soft-to-hard rubber-to-plastic compositions may be obtained. Regardless of the curing conditions, the liquid oligomeric divinyl-terminated aromatic ether-aromatic ketone-containing compounds may be converted to a thermoset or can be injected into a fiber-reinforced perform for the fabrication of complex shaped composite components. The thermosets (elastomers and plastics) or cured polymers may show outstanding and superior thermooxidative properties. The overall physical properties may be tailored by varying the diol or bisphenol reactant. Regardless of whether the cured polymer is an elastomer or a plastic, clear shaped films or solids are formed, which may be useful for electronic, electrical, and structural applications. By using a less reactive catalyst in the cure reaction, the viscosity of the polymerization system may be easily controlled for extended periods yielding a processing window, which may be advantageous for the fabrication of complex composite components and device coatings. Due to the thermal and oxidative stability of thermoset or network polymers cured to temperatures in excess of 350° C., the materials have potential for a variety of applications including the fabrication of advanced composite components (ship, aerospace, and marine) by conventional prepreg consolidation, RTM, injection molding, and filament winding and as a coating for electronic devices and for electrical insulator for high voltage cables. Due to the high char yield, the vinyl-based polymers of this invention may exhibit improvements in specific physical properties when used at high temperatures or in a fire environment. The thermoset may also be formulated with a material such as, but not limited to, carbon nanotubes, a clay, carbon nanofibers, a metal oxide, or microballoons. Microballoons are micron sized hollow glass beads.

The flexible aromatic ether units may maintain processability (liquid) in the oligomeric divinyl-terminated aromatic ether-aromatic ketone-containing compounds and also contribute to high temperature stability of polymers due to their own inherent thermal stability. By controlling the ratio of reactants, different percentages of vinyl and aromatic ether-aromatic ketone units can be obtained in the resulting oligomeric compound. An ideal combination of reactants can be found to produce a polymer tailored for a particular application.

The following examples are given to illustrate specific applications. These specific examples are not intended to limit the scope of the disclosure in this application.

Example 1

Synthesis of 2:1 Oligomeric Hydroxyl Compound Based on Bisphenol A and 4,4'Dichlorobenzophenone (30% Excess Bisphenol A)

To a 250 mL, three-necked flask fitted with a thermometer, a Dean-Stark trap with condenser, and a nitrogen inlet were added bisphenol A (19.5 g, 85.4 mmol), 4,4'-dichlorobenzophenone (8.21 g, 32.7 mmol), powdered anhydrous $K_2CO_3$ (12.4 g, 98.0 mmol), toluene (15 mL), and dimethylsulfoxide (DMSO) (100 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 170° C. under a nitrogen atmosphere for 6 hr or until no more water was observed being collected in the Dean-Stark trap. The toluene was then slowly distilled and the reaction was cooled to room temperature. The reaction mixture was poured into a 5% aqueous HCl solution (500 mL) resulting in the formation of a solid after stirring for several hours. The material was broken up and collected using a Büchner funnel. The white solid was washed with 200 mL of distilled water until neutral. The isolated solid was vacuum dried to yield the 2:1 oligomeric dihydroxyl terminated compound containing 30% excess bisphenol A (24.2 g, 95% yield). IR $[cm^{-1}]$: $\lambda$ 3352 (OH), 3058 (C=CH), 2969 ($CH_3$), 1591 (C=C), 1490 (aromatic), 1285 ($CH_3$), 1247 (C—O), 1173 (C—O), 970 (C—O), 835 (aromatic).

Example 2

Synthesis of 2:1 Oligomeric Vinylsilane Terminated Resin Based on Bisphenol A (30% Excess Bisphenol A) and 4,4'-Dichlorobenzophenone To a 100 mL, three-necked flask fitted with a thermometer, a Dean-Stark trap with condenser, and a nitrogen inlet were added the mixture (13.0 g) containing the 2:1 oligomeric hydroxyl compound and 30% excess bisphenol A prepared as in Example 1, triethylamine (8.75 ml, 63.0 mmol), and anhydrous tetrahydrofuran (100 mL). The reaction mixture was cooled by means of an ice bath and vinyl(dimethylchloro) silane (8.49 ml, 61.5 mmol) was added dropwise. The resulting mixture was refluxed while stirring for 24 h. The mixture was then filtered to remove the amine salts and the solvent was removed under vacuum. The oil was heated at 120° C. under vacuum to remove solvents and impurities yielding the mixture of 2:1 oligomeric vinyl silane terminated resin and bisphenol A vinylsilane terminated resin (16.7 g, 91%). The resin mixture exhibited excellent flow properties by the inclusion of the excess bisphenol A vinylsilane terminated resin. IR $[cm^{-1}]$: $\lambda$ 3052 (C=CH), 2967 ($CH_3$), 1654 (C=O), 1593 (C=C), 1500 (aromatic), 1242 (C—O), 1171 (C—O), 834 (aromatic).

Example 3

Catalytic Hydrosilylation Reaction with Mixture Containing 2:1 Oligomeric Vinylsilane Terminated Resin and Bisphenol A Vinylsilane Terminated Resin and Tetrakis(Dimethylsiloxy)Silane (2.5:1 Ratio, Slow Cure)

A composition (0.45 g) formulated from the mixture of 2:1 oligomeric vinyl silane terminated resin containing 30% bisphenol A vinylsilane terminated resin prepared from Example 2 and tetrakis(dimethylsiloxy)silane (0.088 mL) was dissolved in 1 mL of dry toluene. With stirring, a slow cure catalyst (10 μL of 2-2.5% platinum-cyclovinylmethylsiloxane complex in xylene solution) was added. The mixture was quickly transferred to a silicone mold and was allowed to gel at room temperature (5 min). The sample was postcured above 100° C. to completely cure the resin. A transparent elastomeric sample was formed, which had good thermal and oxidative stability, and retained >40% weight after heating under air to 1000° C.

Example 4

Catalytic Hydrosilylation Reaction with Mixture Containing 2:1 Oligomeric Vinylsilane Terminated Resin and Bisphenol A Vinylsilane Terminated Resin and Tetrakis(Dimethylsiloxy)Silane (2.5:1 Ratio, Rapid Cure)

A composition (0.45 g) formulated from the mixture of 2:1 oligomeric vinyl silane terminated resin containing 30% excess bisphenol A vinylsilane terminated resin prepared from Example 2 and tetrakis(dimethylsiloxy) silane (0.088 mL) was dissolved in 1 mL of dry toluene. With stirring, a rapid cure catalyst (10 μL of 2-2.5% platinum-vinylmethylsiloxane complex in xylene solution) was added. The mixture was quickly transferred to a silicone mold and was allowed to gel at room temperature (15 seconds). The sample was post-cured above 100° C. to completely cure the resin. A transparent elastomeric sample was formed, which had good thermal and oxidative stability, and retained >40% weight after heating under air to 1000° C.

Example 5

Catalytic Hydrosilylation Reaction with Mixture Containing 2:1 Oligomeric Vinylsilane Terminated Resin and Bisphenol a Vinylsilane Terminated Resin and 1,1,3,3-Tetramethyldisiloxane (1:1 Ratio, Rapid Cure)

A composition (1.00 g) formulated from the mixture of 2:1 oligomeric vinyl silane terminated resin containing 30% excess bisphenol A vinylsilane terminated resin prepared from Example 2 and 1,1,3,3-tetramethyldisiloxane (0.27 mL) was dissolved in 1 mL of dry toluene. With stirring, a rapid cure catalyst (25 μL of 2-2.5% platinum-vinylmethylsiloxane complex in xylene solution) was added. The mixture was quickly transferred to a silicone mold and allowed to thicken at room temperature (1 min). The sample was postcured above 100° C. to complete the cure reaction. A transparent viscous liquid sample was formed, which had good thermal and oxidative stability, and retained >40% weight after heating under air to 1000° C.

Example 6

Synthesis of 2:1 Oligomeric Hydroxyl Compound Based on Bisphenol A6F (25% Excess) and 4,4'-Dichlorobenzophenone To a 2000 mL, three-necked flask fitted with a thermometer, a Dean-Stark trap with condenser, and a nitrogen inlet were added bisphenol A6F (100 g, 298 mmol), 4,4'-dichlorobenzophenone (26.5 g, 106 mmol), powdered anhydrous $K_2CO_3$ (43.1 g, 312 mmol), toluene (15 mL), and dimethylsulfoxide (DMSO) (500 mL). Toluene was used to control the refluxing azeotropic removal of water and the temperature of the reaction content. The resulting mixture was degassed with nitrogen at ambient temperature and the Dean-Stark trap was filled with toluene. The mixture was refluxed at 165-170° C. under a nitrogen atmosphere for 5 hr or until no more water was observed being collected in the Dean-Stark trap. The toluene was then slowly distilled off, causing the temperature to rise in the reaction vessel, to enhance the yield of the intermediate hydroxyl salt and high conversion to this intermediate. The mixture was cooled and poured into a 5% aqueous HCl solution (500 mL) resulting in the formation of a solid after stirring for several hours. The material was broken up and collected using a Büchner funnel. The white solid was washed with 200 mL of distilled water until neutral. The isolated solid was vacuum dried to yield the 2:1 oligomeric dihydroxyl terminated compound containing 25% excess bisphenol A6F (112.4 g, 95% yield). IR [cm-1]: λ 3350 (OH), 3058 (C=CH), 1590 (C=C), 1492 (aromatic), 1246 (C—O), 1174 (C—O), 972 (C—O), 836 (aromatic).

Example 7

Synthesis of Mixture of 2:1 Oligomeric Vinylsilane Terminated Resin and Bisphenol A6F Vinylsilane Terminated Resin To a 100 mL, three-necked flask fitted with a thermometer, a Dean-Stark trap with condenser, and a nitrogen inlet were added the mixture (11.7 g) containing the 2:1 bisphenol A6F/benzophenone based hydroxyl terminated aromatic ether oligomer and 25% excess bisphenol A6F prepared from Example 6, triethylamine (5.07 ml, 36.4 mmol), and anhydrous tetrahydrofuran (100 mL). The reaction mixture was cooled by means of an ice bath and vinyl(dimethylchloro) silane (4.97 ml, 36.0 mmol) was added dropwise. The resulting mixture was stirred at refluxed for 1 h. The mixture was poured into water and extracted with diethyl ether. The solvent was removed in vacuo and the resulting oil was dissolved in 1:1 methylene chloride:hexane and filtered through a silica plug. The solvent was removed in vacuo and the clear oil was vacuum dried to yield a mixture of the 2:1 oligomeric vinyl silane terminated resin and bisphenol A6F vinylsilane terminated resin (13.4 g, 92%). The resin exhibited excellent flow properties by the inclusion of the excess bisphenol A6F vinylsilane terminated resin. IR [cm-1]: λ 3051 (C=CH), 2968 (CH$_3$), 1654 (C=O), 1590 (C=C), 1501 (aromatic), 1242 (C—O), 1171 (C—O), 833 (aromatic).

Example 8

Catalytic Hydrosilylation Reaction with Mixture of 2:1 Oligomeric Vinylsilane Terminated Resin and Bisphenol A6F Vinylsilane Terminated Resin and Methyl Tris(Dimethylsiloxy)Silane (2:1 Ratio, Rapid Cure)

A composition (0.36 g) formulated from a mixture of the 2:1 oligomeric vinyl silane terminated resin containing 25% excess bisphenol A6F vinylsilane terminated resin prepared from Example 7 and methyl tris(dimethylsiloxy)silane (0.055 mL) was dissolved in 1 mL of dry toluene. With stirring, a rapid cure catalyst (10 µL of 2-2.5% platinum-vinylmethyl-siloxane complex in xylene solution) was added. The mixture was quickly transferred to a silicone mold and was allowed to gel at room temperature (20 seconds). The sample was post-cured above 100° C. to completely cure the resin. A transparent elastomeric sample was formed, which had good thermal and oxidative stability, and retained >40% weight after heating under air to 1000° C.

Example 9

Catalytic Hydrosilylation Reaction with Mixture of 2:1 Oligomeric Vinylsilane Terminated Resin Based on Bisphenol A6F and 4,4'-Difluorobenzophenone and Hydride Terminated Polydimethylsiloxane (1:1 Ratio, Rapid Cure)

A composition (0.17 g) formulated from a mixture of the 2:1 oligomeric vinyl silane terminated resin containing 25% excess bisphenol A6F vinylsilane terminated resin prepared from Example 7 and hydride terminated polydimethylsiloxane (m.w. ~450 g/mol) (0.08 g) was dissolved in 1 mL of dry toluene. With stirring, a rapid cure catalyst (15 µL of a 2-2.5% platinum-vinylmethylsiloxane complex in xylene solution) was added. The mixture was quickly transferred to a silicone mold and allowed to thicken to a gel at room temperature (1 min). The sample was postcured above 100° C. to complete the cure reaction. A transparent viscous liquid sample was formed, which had good thermal and oxidative stability, retained >40% weight after heating under air to 1000° C., and exhibited a glass transition temperature below –20° C.

Example 10

Synthesis of 2:1 Oligomeric Hydroxyl Compound Based on Reaction of Excess Amount of Bisphenol a and Resorcinol with 4,4'-Dichlorobenzophenone To a 250 mL, three-necked flask fitted with a thermometer, a Dean-Stark trap with condenser, and a nitrogen inlet were added bisphenol A (10.0 g, 43.8 mmol), resorcinol (5.82 g, 52.9 mmol), 4,4'-dichlorobenzophenone (12.1 g, 48.4 mmol), powdered anhydrous K$_2$CO$_3$ (14.0 g, 101 mmol), toluene (15 mL), and dimethylsulfoxide (DMSO) (100 mL). Toluene was added to control the refluxing azeotropic removal of water and the temperature of the reaction content. The resulting mixture was degassed with nitrogen at ambient temperature and the Dean-Stark trap was filled with toluene. The mixture was refluxed at 170° C. under a nitrogen atmosphere for 6 hr or until no more water was observed being collected in the Dean-Stark trap. The toluene was then slowly distilled and the reaction mixture was cooled to room temperature. The reaction mixture was poured into a 5% aqueous HCl solution (500 mL) resulting in the formation of a solid after stirring for several hours. The material was broken up and collected using a Büchner funnel. The white solid was washed with 200 mL of distilled water until neutral. The isolated solid was vacuum dried to yield a mixture (22.3 g, 95% yield) containing the 2:1 oligomeric dihydroxyl terminated compound and excess resorcinol and bisphenol A (both may be used). IR [cm$^{-1}$]: λ 3352 (OH), 3058 (C=CH), 2969 (CH$_3$), 1591 (C=C), 1490 (aromatic), 1285 (CH$_3$), 1247 (C—O), 1173 (C—O), 970 (C—O), 835 (aromatic).

Example 11

Synthesis of Mixture of 2:1 Oligomeric Vinyl Silane Terminated Resin Along with Bisphenol A and Resorcinol Vinylsilane Terminated Resins To a 100 mL, three-necked flask fitted with a thermometer, a Dean-Stark trap with condenser, and a nitrogen inlet were added the mixture (10.0 g) of the 2:1 oligomeric hydroxyl compound and the excess resorcinol and bisphenol A prepared from Example 10, triethylamine (6.1 ml, 44.1 mmol) and anhydrous tetrahydrofuran (100 mL). The reaction mixture was cooled by means of an ice bath and vinyl(dimethylchloro)silane (5.8 ml, 42.1 mmol) was added dropwise. The resulting mixture was refluxed with stirring for 24 h. The product mixture was then filtered to remove the amine salts and the solvent was removed under vacuum. The oil was heated at 120° C. under vacuum to remove solvents and impurities yielding the resin mixture (13.2 g, 96%) containing 2:1 oligomeric vinylsilane terminated resin and the resorcinol and bisphenol A vinylsilane terminated resins. The resulting resin mixture exhibited excellent flow properties by the inclusion of the resorcinol and bisphenol A vinylsilane terminated resins. IR [cm$^{-1}$]: λ 3052 (C=CH), 2967 (CH$_3$), 1654 (C=O), 1593 (C=C), 1500 (aromatic), 1242 (C—O), 1171 (C—O), 834 (aromatic).

Example 12

Catalytic Hydrosilylation Reaction of Mixture of 2:1 Oligomeric Vinyl Silane Terminated Resin Along with Bisphenol a and Resorcinol Vinylsilane Terminated Resins and Tetrakis(Dimethylsiloxy)Silane (2:1 Ratio, Rapid Cure)

A composition (1.0 g) formulated from the mixture containing the 2:1 oligomeric vinyl silane terminated resin along with bisphenol A and resorcinol vinylsilane terminated resins from Example 11 and tetrakis(dimethylsiloxy)silane (0.28 mL) was dissolved in 2 mL of dry toluene. With stirring, a rapid cure catalyst (15 µL of 2-2.5% platinum-vinylmethylsiloxane complex in xylene solution) was added. The mixture was quickly transferred to a silicone mold and was allowed to gel at room temperature (25 seconds). The sample was post-cured above 100° C. to completely cure the resin. A transparent elastomeric sample was formed, which had good thermal and oxidative stability, and retained >40% weight after heating under air to 1000° C.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:
1. A method comprising:
   providing a solution comprising:
      a dichloroaromatic compound comprising an electron-withdrawing group bound to each aromatic ring containing one of the chloride groups;
      an excess of a dihydroxyaromatic compound;
      a base; and
      a solvent;
   heating the solution to a temperature at which the dichloroaromatic compound and the dihydroxyaromatic compound react to form an aromatic ether oligomer;
   wherein the aromatic ether oligomer is a dihydroxy-terminated compound or a dimetallic salt thereof;
   wherein water formed during the heating is concurrently distilled from the solution; and
   reacting the aromatic ether oligomer with a chlorodialkylvinylsilane to form one or more vinyl-terminated compounds having the formula:

wherein each R is an independently selected alkyl group;
wherein Ar$^1$ is a residue from the dichloroaromatic compound;
wherein Ar$^2$ is a residue from the dihydroxyaromatic compound; and
wherein n is a non-negative integer.

2. The method of claim 1, wherein the chlorodialkylvinylsilane is vinyl(dimethylchloro)silane.

3. The method of claim 1, wherein the vinyl-terminated compounds comprise the compound:

4. The method of claim 1, wherein the vinyl-terminated compounds comprise the compounds:

5. The method of claim 1, wherein the base is potassium carbonate, sodium hydroxide, potassium hydroxide, or a combination thereof.

6. The method of claim 1, wherein the electron-withdrawing group is a carbonyl group.

7. The method of claim 1, wherein the electron-withdrawing group is a sulfonyl group, a sulfinyl group, or a phosphoryl group.

8. The method of claim 1, wherein the heating is continued until the reaction yield of the aromatic ether oligomer is at least 90%.

9. The method of claim 1, wherein the molar ratio of the dihydroxyaromatic compound to the dichloroaromatic compound is from 2:1 to 3:1.

10. The method of claim 1, wherein the dichloroaromatic compound is dichlorobenzophenone or 4,4'-dichlorobenzophenone.

11. The method of claim 1, wherein the dihydroxyaromatic compound is a bisphenol, 2,2-bis(4-hydroxyphenyl)propane, 1,1,1,3,3,3-hexafluoro-2,2-bis(4-hydroxyphenyl)propane, 4,4'-dihydroxybiphenyl, or resorcinol, 4,4'-dihydroxybiphenyl.

12. The method of claim 1, wherein the solution further comprises:
   an organic transition metal complex or a transition metal salt.

13. The method of claim 12, wherein the organic transition metal complex is an organic copper complex.

14. The method of claim 13, wherein the organic copper complex is $(PPh_3)_3CuBr$.

15. The method of claim 1, wherein the solvent is a mixture of toluene and dimethylsulfoxide.

16. The method of claim 1, wherein the heating is performed at in excess of 150° C.

17. The method of claim 1, further comprising:
   reacting the vinyl-terminated compounds with a crosslinker having at least two silyl hydrogen atoms.

18. The method of claim 17, wherein the crosslinker is phenyl tris(dimethylsiloxy)silane, methyl
   tris(dimethylsiloxy)silane, tetrakis(dimethylsiloxy)silane, 1,1,3,3-tetramethyldisiloxane, tris(dimethylsilyl)benzene, p-bis(dimethylsilyl)benzene, bis[(p-dimethylsilyl)phenyl] ether, diphenylsilane,
   1,1,3,3,5,5,7,7-octamethyltetrasiloxane, or a hydride terminated polydimethylsiloxane.

\* \* \* \* \*